US006464221B1

(12) United States Patent

Hishinuma et al.

(10) Patent No.: US 6,464,221 B1

(45) Date of Patent: Oct. 15, 2002

(54) COIN RECEIVING PAN OF A GAME MACHINE HAVING A TRAY WITH GROOVES FOR ARRANGING COINS

(75) Inventors: Takaaki Hishinuma; Susumu Takeuchi, both of Tokyo (JP)

(73) Assignee: Universal Sales Co., Ltd., Tokyo (JP)

( * ) Notice: Subject to any disclaimer, the term of this patent is extended or adjusted under 35 U.S.C. 154(b) by 0 days.

(21) Appl. No.: 09/524,530

(22) Filed: Mar. 13, 2000

Related U.S. Application Data

(62) Division of application No. 09/131,502, filed on Aug. 10, 1998, now Pat. No. 6,047,966.

(30) Foreign Application Priority Data

Oct. 14, 1997 (JP) ............................................ 9-296392

(51) Int. Cl.[7] ................................................ A63F 13/08

(52) U.S. Cl. ............................... 273/148 R; 273/143 R

(58) Field of Search ......................... 273/143 R, 148 R, 273/138.2; 463/20

(56) References Cited

U.S. PATENT DOCUMENTS

| | | | | | |
|---|---|---|---|---|---|
| 3,313,447 | A | | 4/1967 | Brown | |
| 4,030,597 | A | * | 6/1977 | McCarthy | 206/83 |
| 4,607,648 | A | | 8/1986 | Hough | |
| 4,846,333 | A | | 7/1989 | Kissick | |
| 5,026,972 | A | * | 6/1991 | Kanehara et al. | 235/32 |

FOREIGN PATENT DOCUMENTS

| | | | | |
|---|---|---|---|---|
| EP | 0 575 136 | | 12/1993 | |
| GB | 2 105 508 | | 3/1983 | |
| JP | 6-31054 | | 2/1994 | |
| JP | 6-79059 | | 3/1994 | |
| JP | 6-285240 | | 10/1994 | |
| JP | 6-304320 | | 11/1994 | |
| JP | 10151238 | * | 6/1998 | 273/143 R |
| JP | 10174738 | * | 6/1998 | 273/143 R |
| JP | 10295876 | * | 11/1998 | 273/143 R |

* cited by examiner

*Primary Examiner*—Benjamin H. Layno

(74) *Attorney, Agent, or Firm*—Pillsbury Winthrop, LLP

(57) ABSTRACT

A coin game machine enables a player to easily count the number of coins 23 that are paid out from a coin pay-out hole 10 of the coin game machine. Three rows of grooves 22*a* are formed on a receiving pan 22 of the coin game machine. The coins 23 that are paid out from the coin pay-out hole 10 are orderly lined up along each of the grooves 22*a*. Therefore, the player can see all the coins 23 and count the number of the coins 23 easily. In this case, by counting in advance the number of coins that can be stored in each row of the grooves 22*a*, the player can count the number of coins stored on the receiving pan 22 further easily.

12 Claims, 5 Drawing Sheets

COIN RECEIVING PAN OF A GAME MACHINE HAVING A TRAY WITH GROOVES FOR ARRANGING COINS

This patent application is a divisional application of Ser. No. 09/131,502 filed Aug. 10, 1998, now U. S. Pat. No. 6,047,966, has been inserted.

This patent application claims priority based on the Japanese patent application, H09-296392, filed on Oct. 14, 1997, the contents of which are incorporated herein by reference.

BACKGROUND OF THE INVENTION

1. Field of the Invention

The present invention relates to a coin game machine, which requires coins as game mediums to play a game and pays out coins onto a receiving pan when a player wins a prize during the game. The present invention relates also to a coin storage apparatus that is installed in this coin game machine.

2. Description of Related Art

A slot machine 1 shown in the oblique view drawing of FIG. 1 is an example of a conventional coin machine of this type.

A display panel 2 is installed on the upper half portion of the front side of the slot machine 1. Multiple windows 3 are formed on the display panel 2. Each of multiple rotation reels 4 is visible through each of the corresponding windows 3. Various symbols not shown in the drawing are depicted on the exterior surface of each of the rotation reels 4. A frame 6 has a cosmetic panel 5 on the lower half portion of the front side of the slot machine 1. Pictures not shown in the drawing such as characters and the like are depicted on the surface of the cosmetic panel 5. A fluorescent light bulb is installed inside the slot machine 1 on the back of the cosmetic panel 5. The fluorescent light bulb illuminates the pictures such as characters and the like from inside the slot machine 1.

When the player puts coins into a deposit port 7 at the beginning of the game, and operates a start lever 8, each of the reels 4 starts rotate. Each of the reels 4 stops rotating when the player pushes each of stop buttons 9 that corresponds to the respective reel 4. When each of the reels 4 stops rotating, a symbol is displayed on the corresponding window 3. When all the reels 4 stop rotating and the obtained set of symbols matches a prescribed prize combination, a prize is awarded to the player. In this case, the slot machine 1 pays out coins from a pay-out hole 10 of a pay-out portion 13, which is located near the bottom of the cosmetic panel 5, onto a receiving pan 11. The number of coins to be paid out to the player is determined by the prize. An ashtray 12 into which the player can dispose of cigarette ash is installed next to the receiving pan 11.

However, according to the above-described conventional slot machine 1, coins are ejected almost parallel to the flat bottom surface of the receiving pan 11 from the pay-out hole 10 to the bottom surface of the receiving pan 11. Then the coins are laid flat on the flat bottom surface of the receiving pan 11. When additional coins are ejected from the pay-out hole 10, they are laid flat over the coins that had already been delivered to the bottom surface of the receiving pan 11. Therefore, in the conventional slot machine 1, the coins that are paid out from the pay-out hole 10 pile up on the receiving pan 11.

As a result, in the conventional slot machine 1, the coins lying in the lower portion of the pile are not visible to the player, making it impossible for the player to count at a glance the number of coins the player has. Consequently, the player cannot always determine the exact timing at which the player should exchange the coins with the prize items.

In addition, in the conventional slot machine 1, since coins pile up on the receiving pan 11, it is difficult to take out the coins from the receiving pan 11. This makes it difficult for the player to put new coins smoothly into the deposit port 7, disrupting a smooth game play.

SUMMARY OF THE INVENTION

Therefore, it is an object of the present invention to provide a coin game machine, which requires coins as game mediums to play a game and pays out coins onto a receiving pan when a player wins a prize during the game, and determines the number of coins in accordance with the prize. The coin game machine has a coin receiving pan for receiving coins from a pay-out hole of a coin game machine in which grooves are formed on the bottom surface of the coin receiving pan for lining up the coins. It is also an object of the present invention to provide a coin storage apparatus having a coin receiving pan for receiving coins from a pay-out hole of a coin game machine, and a tray on which grooves for lining up coins to store are formed on the exposed surface of the tray, so that the tray fits into the coin receiving pan.

Due to the grooves formed on the receiving pan or tray, the coins paid out from the pay-out hole are orderly lined up on the grooves. In this way, all the coins delivered from the pay-out hole can be identified at a glance, making it easy for the player to count the number of coins in possession. Thus the player can determine the exact timing at which the player should exchange the coins with the prize items. In addition, the grooves make it easy for the player to take out the coins stored on the coin receiving pan, enabling the player to play the game smoothly.

In addition, according to the present invention, an indented coin receiving unit is formed on a coin receiving portion of the receiving pan or tray. The grooves are formed on the side portion of the coin receiving unit.

According to the present invention, when coins are paid out from the pay-out hole, the coins are temporarily stored on the coin receiving unit, and then are lead to the grooves. Without this coin receiving unit, the paid-out coins are randomly delivered to the grooves, making it necessary to line up the coins. However, according to the present invention, the paid-out coins can be easily lined up sequentially in each of the grooves.

In addition, according to the present invention, a hill-shaped portion having a slope is formed on a portion of the receiving pan or tray onto which coins are dropped from the pay-out hole. When the coins are ejected horizontally parallel to the bottom surface of the coin receiving pan, the slope of the hill-shaped portion cause the horizontally projected coins to turn, so as to become vertical to the bottom surface of the receiving pan. The interior surface of the side wall of the coin receiving pan or tray which faces the pay-out hole is connected to the slope, and grooves are formed parallel to the direction in which the coins are ejected from the pay-out hole.

According to the present invention, the coins, which have been ejected horizontally parallel to the bottom surface of the coin receiving pan from the pay-out hole, are guided to the slope of the hill-shaped portion on the receiving pan or tray. As the coins slide along the slope, the coins are rotated so as to become vertical to the bottom surface of the coin receiving pan. The coins that have become vertical to the bottom surface of the coin receiving pan roll along the interior surface of the wall that continues from the slope, and stop. When the coins stop rolling, the coins are moved by the player toward the grooves that lead to the pay-out hole, and are lined up inside the grooves.

According to the present invention, the tray is constituted of transparent resin containing fluorescent coloring matters.

In this configuration, a light source is installed inside the game machine. The built-in light source emits light and the light leaks from the coin pay-out hole. The light that has leaked from the coin pay-out hole enters inside parts of the tray that is attached to the receiving pan. The incident light is reflected repeatedly inside the tray. When this reflected light exits from the edge portion of the grooves having a small surface area to the outside of the parts of the tray, the edge portion of the grooves appears much brighter than the other parts of the grooves due to the edge light effect. The fluorescent coloring matters contained inside the tray enhances the brightness of the edge portion of the grooves. Therefore, the tray looks gorgeous decorated with the edge light, enabling the player to enjoy the game.

In addition, according to the present invention, indices for indicating the number of coins are marked on each of the grooves.

According to the present invention, the indices enable the player to count further easily the number of coins that are lined up on each of the grooves.

DETAILED DESCRIPTION OF THE INVENTION

The preferred embodiments of the present invention will be explained in reference to the attached drawings.

Next, the first embodiment of the present invention will be explained, in which a coin game machine according to the present invention is applied to the above-explained slot machine.

Figure 2A:
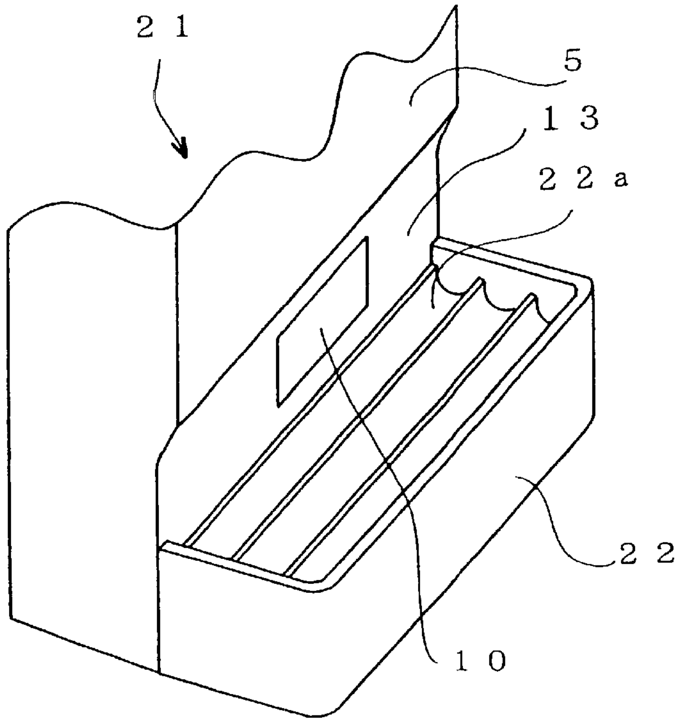
FIGS. 2A through 2E show the configuration of a coin receiving pan portion of a coin game machine according to the first embodiment of the present invention.

FIG. 2A is an oblique view of the lower half portion of a slot machine 21 according to the present embodiment.

Figure 1:
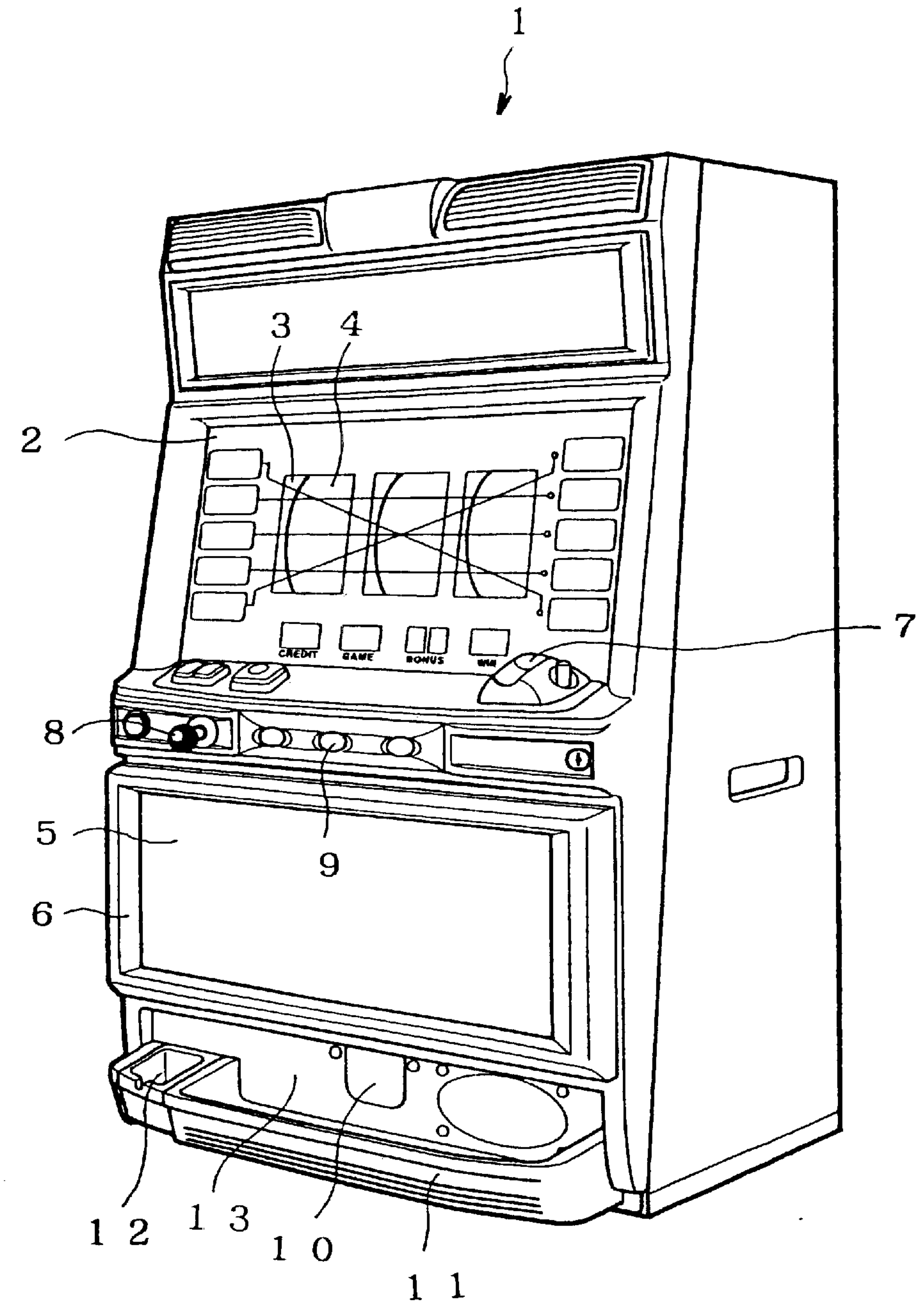
FIG. 1 is an oblique view of a conventional slot machine.

In the slot machine 21 according to the present embodiment also, coins are used as game mediums for playing the game. A coin pay-out portion 13 is located in the bottom portion of a cosmetic panel 5. When the player wins a prize, coins are paid out to the player from a coin pay-out portion 13 having a pay-out hole 10 onto a coin receiving pan 22. The number of coins to be paid out to the player is determined by the prize. According to the present embodiment, grooves 22*a* on which the coins are to be lined up are formed on the bottom surface of the coin receiving pan 22 of the slot machine 21. The rest of the structure of the slot machine 21 is identical to that of the slot machine 1 shown in FIG. 1.

Figure 2B:
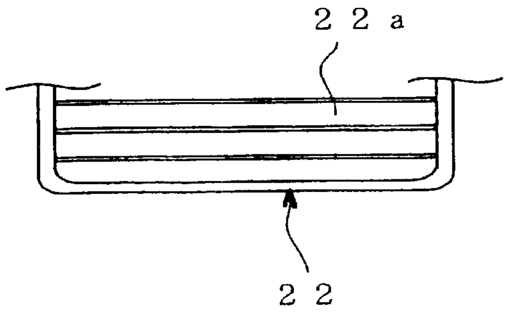
Figure 2C:
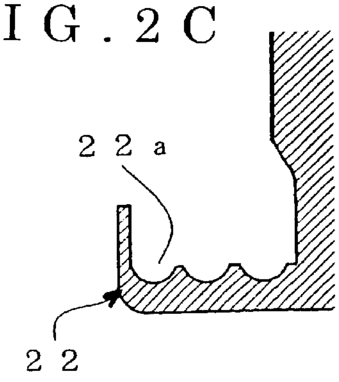
Figure 2D:
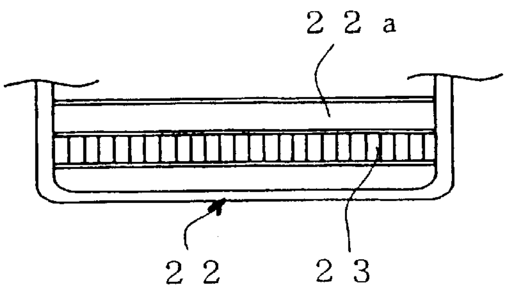
Figure 2E:
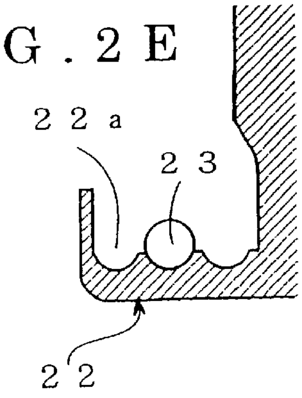

FIGS. 2B and 2D are top views of the coin receiving pan 22. The top sides of these drawings correspond to the main body side of the slot machine 21. The bottom sides of these drawings correspond to the player side of the slot machine 21. FIGS. 2C and 2E are side view cross sections of the receiving pan 22. The right sides of these drawings correspond to the main body side of the slot machine 21. The left sides of these drawings correspond to the player side of the slot machine 21. As shown in FIGS. 2B and 2C, three rows of grooves 22*a* are formed on the bottom surface of the coin receiving pan 22. A prescribed number of coins can be lined up on each of these grooves 22*a*.

FIGS. 2D and 2E show a state in which coins 23 are lined up along the middle groove 22*a*. The coins 23 are packed in such a way that each of the coins 23 stands vertical to the bottom surface of the coin receiving pan 22. The depth of each of the grooves 22*a* is set so that the coins can be taken out without difficulty from the coin receiving pan 22.

Since the grooves 22*a* are formed on the bottom surface of the coin receiving pan 22, the coins 23 that have been ejected from the pay-out hole 10 are lined up orderly along the grooves 22*a*. Therefore, all the coins 23 are visible to the player, making it easy for the player to count the number of the coins 23. In this case, if the player counts the number of coins that can be stored in each row of the grooves 22*a* in advance, the player can count the number of coins stored on the grooves 22*a* more easily. Thus, according to the present invention, since the player is able to count the number of coins in possession easily, the player can determine exactly when to exchange the coins with the prize items.

In addition, since the coins 23 are lined up orderly in the grooves 22*a*, the player can easily take out the coins 23 that are stored in the coin receiving pan 22. Then the player can put the coins 23 into a dollar box or the like for accommodating and carrying the coins 23. Hence, the player can take out the coins 23 from the coin receiving pan 22, and smoothly put the coins 23 into the deposit port 7. In this way, the player can play the game smoothly.

Next, the second embodiment of the present invention will be explained, in which a coin storage apparatus according to the present invention is applied to the above-explained slot machine.

Figure 3A:
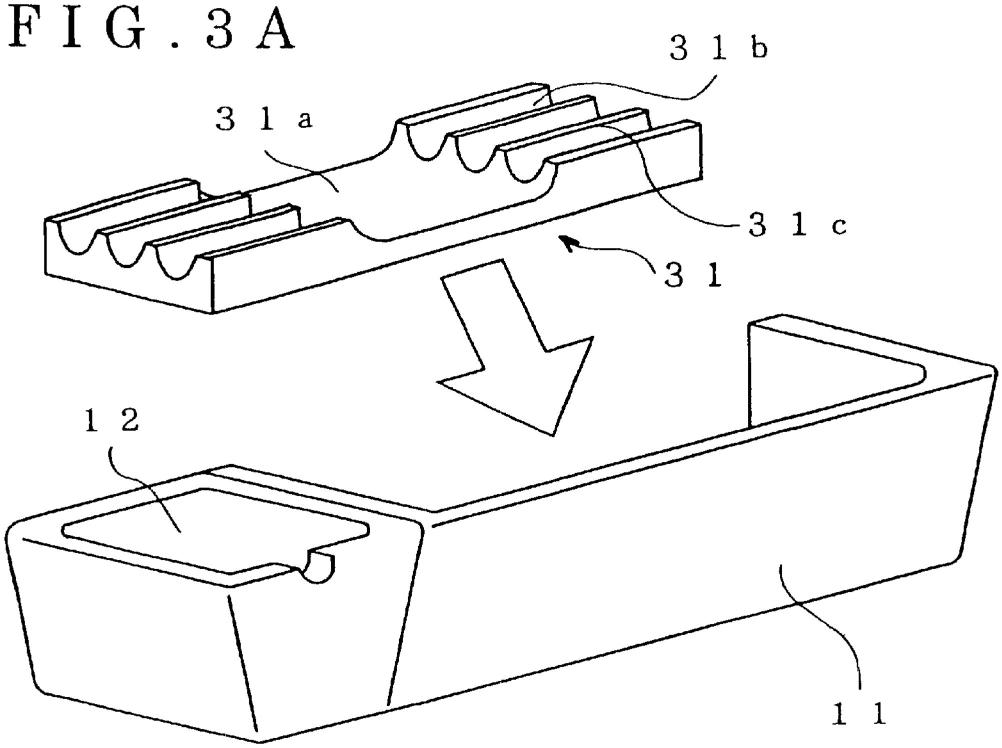
FIGS. 3A through 3C show the configuration of a coin receiving pan portion of a coin storage apparatus according to the second embodiment of the present invention.

FIG. 3A is an oblique view of the structure of the coin receiving pan unit of a slot machine according to the present embodiment. The other parts of the slot machine according to the present embodiment are structured identically as the corresponding parts of the conventional slot machine 1 shown in FIG. 1.

According to the present embodiment, a counting tray 31 is removably installed on the flat bottom surface of the coin receiving pan 11, which faces to the pay-out hole 10. This tray 31 has the size just fit in the coin receiving pan 11 and is constituted of transparent acrylic resin containing fluorescent coloring matters. An exposed portion of the upper surface of the counting tray 31 receives coins that are paid out from the pay-out hole 10. A coin receiving unit 31*a* is formed on this exposed portion of the upper surface of the counting tray 31. The central portion of the coin receiving unit 31*a* forms a concave surface. The coin receiving pan 11 has a longer span and a shorter span and the grooves 31*b* are formed on both sides of the coin receiving unit 31*a* along the longer span of the coin receiving pan 11.

According to the present embodiment, the coins that are elected from the pay-out hole 10 fall onto the coin receiving unit 31*a*, and are temporarily stored on this coin receiving unit 31*a*. In this case, the temporarily stored coins are collected in the central portion of the coin receiving unit 31*a* since the central portion of the coin receiving unit 31*a* forms a concave surface. These coins are lead to each of the grooves 31*b* by the player, and are lined up on each of the grooves 31*b*.

According to the first embodiment, the game machine does not have this coin receiving unit 31*a*. Hence, the paid-out coins are randomly distributed onto the grooves 22*a*. Thus, the distributed coins need to be rearranged and lined up. However, according to the present embodiment, since the paid-out coins are lead to the grooves 31*b* after being stored temporarily on the coin receiving unit 31*a*, the coins can be easily lined up sequentially along each of the grooves 31*b*. Hence, the player can count the number of coins in the receiving pan 11 further easily.

Figure 3B:
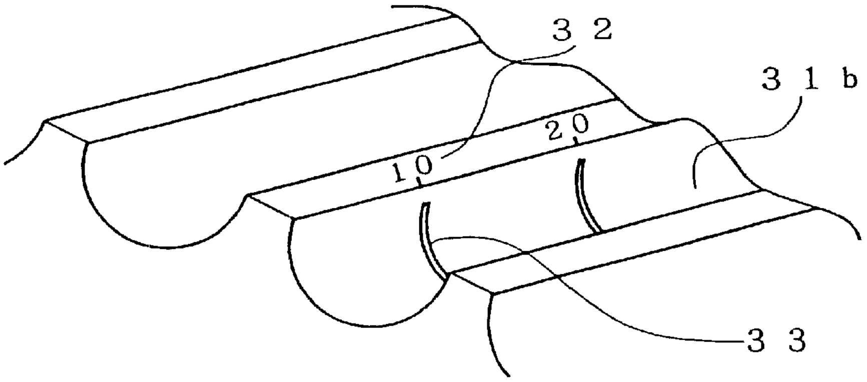

Moreover, as shown in FIG. 3B, by marking indices 32 and 33 on each of the grooves 31*b* so as to indicate the number of coins, the number of coins stored on the grooves 31*b* can be counted even more easily. As shown in FIG. 3B, the number of coins can be easily counted if both the indices 32 and 33 are shown. However, as an alternative, only one of the indices 32 or 33 may be marked.

Since the midsection side end of each of the grooves 31*b* is open, the coins stored on each of the grooves 31*b* can be easily removed from the coin receiving pan 11 by moving the coins to this open end side. In this way, the player can play the game further smoothly.

In addition, the light emitted from the fluorescent light bulb that is installed behind the cosmetic panel 5 leaks from the coin pay-out hole 10. Since the tray 31 is constituted of transparent acrylic resin containing fluorescent coloring matters, when this leaked light enters inside parts of the tray 31, which is installed on the receiving pan 11, the incident light is reflected repeatedly inside the parts of the tray 31. When this reflected light exits from the edge portion 31*c* of the grooves 31*b* having a small surface area or from the carved edge portion of the indices 32 and 33 to outside of the parts of the tray 31, the edge portion of each of the grooves appears much brighter than the other parts of the tray 31 due to the edge light effect. The brightness of the edge portion of each of the grooves is enhanced by the fluorescent coloring matters contained inside the tray 31.

Therefore, the tray 31 looks gorgeous decorated with the edge light. As a result, the slot machine looks colorful, enabling the player to enjoy the game.

Figure 3C:
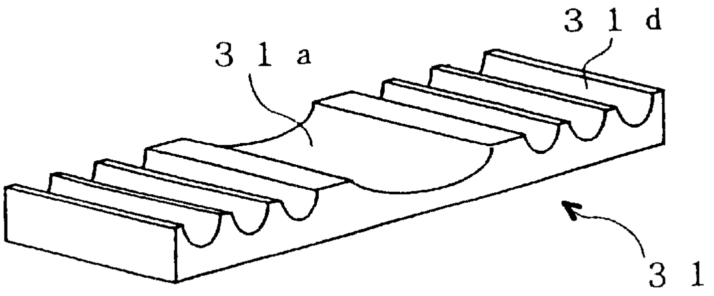

In the present embodiment, the grooves 31*b* of the tray 31 are formed along the longer span of the receiving pan 11. However, alternatively as shown in FIG. 3C, grooves 31*d* of the tray 31 may be formed along the shorter span of the coin receiving pan 11. This alternative configuration also provides the same effect as the present embodiment.

Next, the third embodiment of the present invention will be explained. In the third embodiment, the present invention is applied to the above-explained slot machine.

Figure 4A:
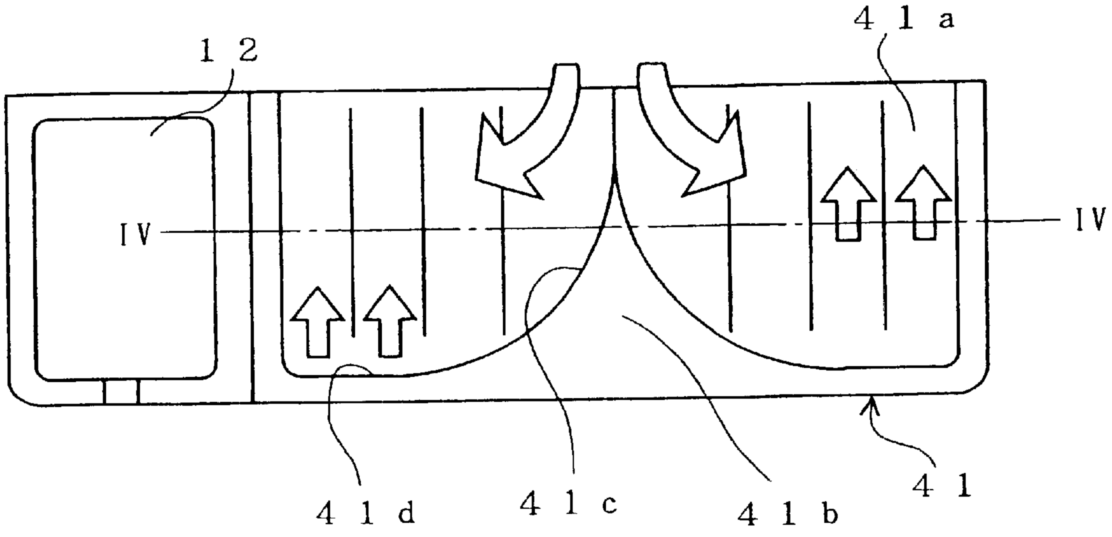
FIGS. 4A and 4B show the configuration of a coin receiving pan portion of a coin game machine according to the third embodiment of the present invention.

FIG. 4A is a top view drawing showing the configuration of a coin receiving pan unit of a slot machine according to the present embodiment. The slot machine according to the present embodiment is structured identically as the slot machine 1 shown in FIG. 1 except for the coin receiving pan unit.

Figure 4B:
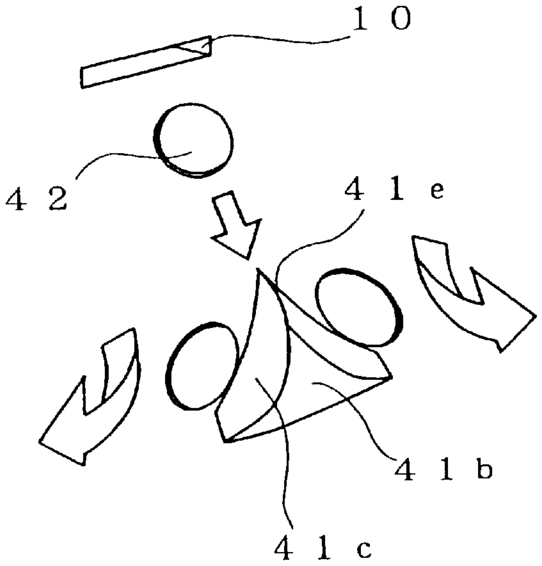
Figure 5A:
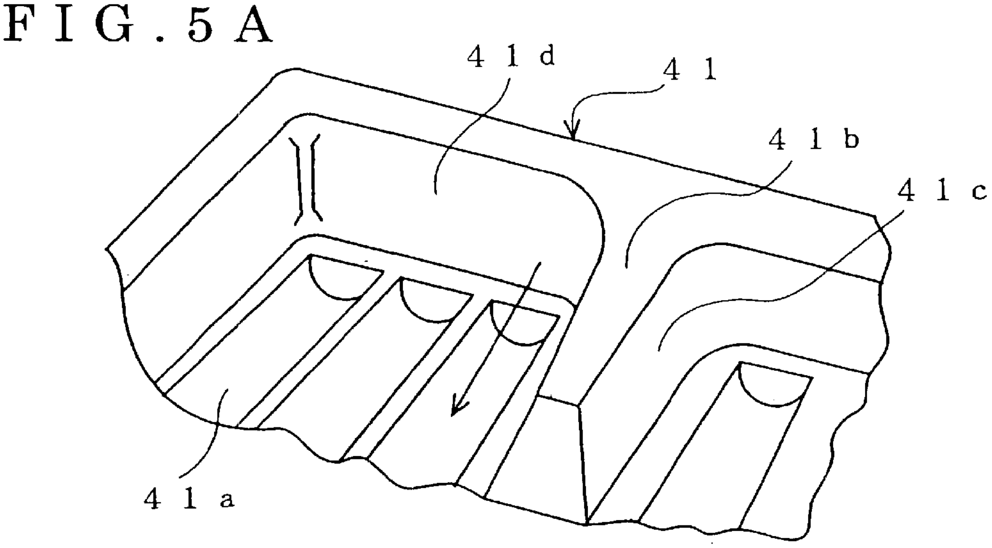
FIGS. 5A through 5C show grooves of the coin receiving pan shown in FIGS. 4A and 4B.

In the present embodiment, grooves 41*a* are formed on a receiving pan 41 along the shorter span of the coin receiving pan 41, that is, in the direction parallel to the direction in which coins are ejected. FIG. 5A is an oblique view of a portion of what is shown in FIG. 4A, which is obtained by breaking out the coin receiving pan 41 along the line IV—IV. In FIG. 5A, the same reference codes are used for the parts that are identical to those used in FIGS. 4A and 4B. The depth of each of the grooves 41*a* is set so that stored coins can be easily removed as in the first embodiment. In FIG. 5A, the direction along the shorter span of the coin receiving pan 41 is indicated by an arrow.

In addition, a coin direction changing unit 41*b* is formed on a portion of the receiving pan 41 on which the ejected coins land. As shown in the drawing, this coin direction changing unit 41*b* has a delta-shaped cross section. As shown in FIG. 4B, the coin direction changing unit 41*b* has two slopes 41*c*. When coins 42 are ejected from the pay-out hole 10, the coins 42 are parallel to the bottom surface of the receiving pan 41. When the horizontally ejected coins 42 land on the unit 41, by the slopes 41*c*, the direction of each of the coins 42 is changed so as to become vertical to the bottom surface of the receiving pan 41. In addition, as shown in FIG. 5A, the interior surfaces of side walls 41*d* of the coin receiving pan 41 that faces the pay-out hole 10 continue smoothly to the slopes 41*c*.

In this configuration, when the coins 42 are ejected horizontally from the pay-out hole 10, parallel to the bottom surface of the receiving pan 41. The ejected coins 42 then hit the edge portion 41*e* of the coin direction changing unit 41*b*. Then the coins 42 are guided to the right or left slope 41*c*, depending on how the coins hit the edge portion 41*e*. As the coins 42 slide along the slopes 41*c*, the coins 42, which have landed on the edge portion 42*e* horizontally, are turned so as to become vertical to the bottom surface of the coin receiving pan 41. The turned coins 42 are guided to the interior surface of the side wall 41*d* that continues from the right or left slope 41*c*. The coins 42 further slide along the interior surface of the side wall 41*d*, and stop, standing along the interior surface of the side wall 41*d*. Then the coins 42 are moved toward the direction along the shorter span of the coin receiving pan 41 and are lined up on the grooves 41*a* by the player.

Figure 5B:
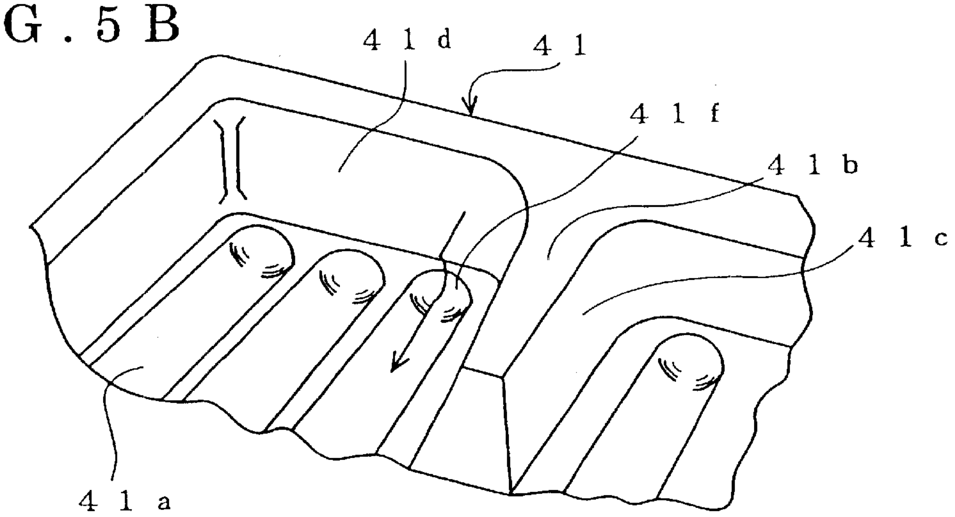

As shown in FIG. 5B, a spherical end 41*f* is carved out at the player side end of each of the grooves 41*a*. The bottom portion of each of the coins 42 that stands along the interior surface of the side wall 41*d* is guided to the spherical end 41*f*. In this way, the coins 42 slide smoothly along each of the grooves 41*a* in the direction indicated by the arrow.

Figure 5C:
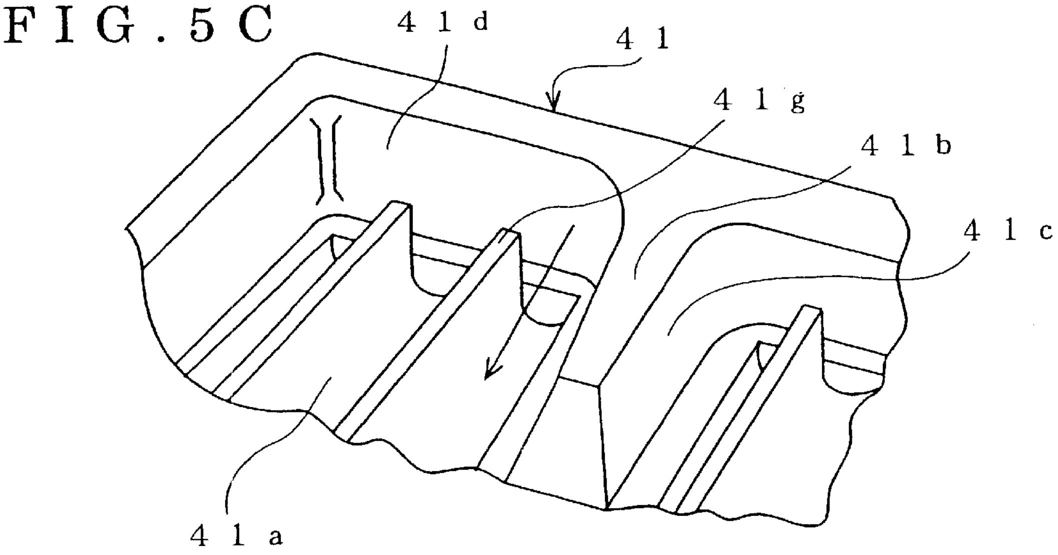

In addition, as shown in FIG. 5C, by increasing the height of partition walls 41*g* that are formed between two adjacent grooves 41*a*, the side portion of each of the coins 42 that stand along the interior surface of the side wall 41*d* is guided to the corresponding partition walls 41*g*. In this way, each of the coins 42 moves smoothly into one of the grooves 41*a*.

In FIGS. 5B and 5C, the same reference codes are given to those parts that are identical to the parts shown in FIG. 5A. Such parts will not be explained here again.

According to the present embodiment, the coins 42 that are paid out from the pay-out hole 10 can be easily lined up on each of the grooves 41*a* that are formed on the coin receiving pan 41. Thus, the player can further easily count the number of coins stored on the coin receiving pan 41.

In the first and third embodiments, the grooves 22*a* and 41*a* on which the coins are lined up are formed on the bottom surfaces of the receiving pans 22 and 41, respectively. However, alternatively as in the second embodiment, the grooves 22*a* or 41*a* may be formed on a counting tray so that the counting tray will be fitted onto the flat bottom surface of the coin receiving pan 22 or 41, respectively. In addition, the coin direction changing unit 41*b* in the third embodiment may also be formed on this counting tray.

In this case, by constituting the counting tray of transparent acrylic resin containing fluorescent coloring matters, the counting tray is decorated with the edge light. As a result, the slot machine looks colorful as has been explained before.

In the second embodiment, the coin receiving unit 31*a*, the grooves 31*b*, and the like are formed on the counting tray 31. However, alternatively as in the first or third embodiment, the coin receiving unit 31*a*, the grooves 31*b*, and the like may be formed on the surface of the receiving pan 11.

In the second embodiment, the indices 32 and 33 for indicating the number of coins are marked on each of the grooves 31*b*. Such indices 32 and 33 may be marked on each of the grooves 22*a* or 41*a* in the first or third embodiment, respectively.

In each of the above-explained embodiments, the coin pay-out hole 10 is located approximately at the center of the coin receiving pan. However, the coin pay-out hole 10 may be displaced from the center of the coin receiving pan toward the right or left side of the coin receiving pan. In this case, the coin receiving unit 31*a* in the second embodiment is formed on the corresponding right or left side of the coin receiving pan 11, and the grooves 31*b* or 31*d* are formed on the remaining portion of the coin receiving pan including the central portion of the coin receiving pan. In this case, the coin direction changing unit 41*b* in the third embodiment has only one slope 41*c* and one interior surface of the side wall 41*d*. Thus, the coins that are ejected from the pay-out hole 10 are always guided to the unique slope 41*c* and unique interior surface of the side wall 41*d*.

In each of the above-explained embodiments, the present invention is applied to a slot machine. However, the present invention may be applied to other amusement machines which use coins as game mediums.

In these cases also, which are achieved by modifying each of the embodiments, the same effects can be achieved as in each of the above-explained embodiments.

Although the present invention has been explained in reference to the embodiments, it is apparent for those skilled in the art that many changes and modifications can be made without departing from the spirit and scope of the invention, as clear from the following claims.

What is claimed is:

1. A coin storage apparatus having:

a coin receiving pan for receiving coins that are ejected from a pay-out hole of a coin game machine; and a tray, on which grooves for storing and lining up the coins that are ejected from the pay-out hole are formed on an exposed surface of the tray, the tray fitting the coin receiving pan, wherein the grooves are formed to fit the shape of the coins.

2. The coin storage apparatus of claim 1 wherein indices for indicating the number of coins are marked on each of the grooves.

3. The coin storage apparatus of claim 1 wherein:

the coin receiving pan has a concave coin receiving unit, which is formed on a portion of the coin receiving pan for receiving coins paid out from the coin pay-our hole; and the grooves are formed on a side portion of the coin receiving unit.

4. The coin storage apparatus of claim 3, wherein the coin receiving pan has a longer span and a shorter span and the grooves are formed along the longer span of the coin receiving pan.

5. The coin storage apparatus of claim 3 wherein indices for indicating the number of coins are marked on each of the grooves.

6. The coin storage apparatus of claim 1 wherein:

the coin pay-out hole ejects coins parallel to the bottom surface of the coin receiving pan;

the tray has a hill-shaped portion including a slope, the hill-shaped portion formed on a portion of the coin receiving pan onto which the coins that are ejected from the coin pay-out hole fall, the slope causing the horizontally ejected coins, which fall parallel to the bottom surface of the coin receiving pan, to become vertical to the bottom surface of the coin receiving pan;

a interior surface of a side wall of the coin receiving pan, which is installed facing the coin pay-out hole, continue smoothly to the slope; and the grooves are formed along a direction that is parallel to the direction in which the coins are ejected.

7. The coin storage apparatus of claim 6 wherein indices for indicating the number of coins are marked on each of the grooves.

8. The coin storage apparatus of claim 6, wherein a spherical end is carved out at a player side end of each of the grooves.

9. The coin storage apparatus of claim 6 wherein high partition wall for separating the grooves are formed.

10. The coin storage apparatus of claim 6 wherein the tray is constituted of a transparent resin containing fluorescent coloring matters.

11. The coin storage apparatus of claim 10 wherein the resin is a transparent acrylic resin.

12. The coin storage apparatus of claim 1, wherein the grooves are formed in a shape of the coins.

* * * * *